United States Patent
Lloyd et al.

(10) Patent No.: US 11,748,104 B2
(45) Date of Patent: Sep. 5, 2023

(54) MICROPROCESSOR THAT FUSES LOAD AND COMPARE INSTRUCTIONS

(71) Applicant: International Business Machines Corporation, Armonk, NY (US)

(72) Inventors: Bryan Lloyd, Austin, TX (US); David A. Hrusecky, Cedar Park, TX (US); Sundeep Chadha, Austin, TX (US); Dung Q. Nguyen, Austin, TX (US); Christian Gerhard Zoellin, Austin, TX (US); Brian W. Thompto, Austin, TX (US); Sheldon Bernard Levenstein, Austin, TX (US); Phillip G. Williams, Cape Coral, FL (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 16/941,969

(22) Filed: Jul. 29, 2020

(65) Prior Publication Data

US 2022/0035634 A1 Feb. 3, 2022

(51) Int. Cl.
*G06F 9/30* (2018.01)
*G06F 9/38* (2018.01)

(52) U.S. Cl.
CPC ...... *G06F 9/30181* (2013.01); *G06F 9/30021* (2013.01); *G06F 9/30043* (2013.01); *G06F 9/3802* (2013.01); *G06F 9/3867* (2013.01)

(58) Field of Classification Search
CPC ............ G06F 9/30021; G06F 9/30043; G06F 9/30181; G06F 9/3842–3838; G06F 9/3826–3838
See application file for complete search history.

(56) References Cited

U.S. PATENT DOCUMENTS

| | | | | |
|---|---|---|---|---|
| 5,974,538 | A * | 10/1999 | Wilmot, II | G06F 9/30069 712/217 |
| 10,372,452 | B2 * | 8/2019 | Kitchin | G06F 9/3838 |
| 10,671,393 | B2 * | 6/2020 | Gschwind | G06F 9/30181 |
| 2009/0235051 | A1 * | 9/2009 | Codrescu | G06F 9/30036 712/205 |
| 2014/0351561 | A1 | 11/2014 | Parks | |
| 2018/0129501 | A1 * | 5/2018 | Levison | G06F 9/30181 |

(Continued)

OTHER PUBLICATIONS

Wetzel et al for IBM, "PowerPC User Instruction Set Architecture", Sep. 2003, Version 2.01, pp. 37 and 58 (Year: 2003).*

(Continued)

*Primary Examiner* — William B Partridge
(74) *Attorney, Agent, or Firm* — David B. Woycechowsky

(57) ABSTRACT

Technology for fusing certain load instructions and compare-immediate instructions in a computer processor having a load-store architecture with respect to transferring data between memory and registers of the computer processor. In some embodiments the load and compare-immediate instructions are consecutive. In some embodiments, the instructions are only merged if: (i) the respective RA and RT fields of the two instructions match; (ii) the immediate field of the compare-immediate instruction has a certain value, or falls within a range of certain values; and/or (iii) the instructions are received in a consecutive manner.

6 Claims, 5 Drawing Sheets

(56) References Cited

U.S. PATENT DOCUMENTS

2019/0042238 A1   2/2019   Genden
2019/0278603 A1   9/2019   Kitchin

OTHER PUBLICATIONS

"Method and Apparatus for Delayed Blocking of the Instruction Issue in Microprocessor Following a Pipeline Start-Up To Reduce the Voltage Droop", An IP.com Prior Art Database Technical Disclosure, Authors et al.: Disclosed Anonymously, IP.com No. IPCOM000244893D, IP.com Electronic Publication Date: Jan. 27, 2016, 5 pages.

"Method and Apparatus To Arbitrate Results From Several Execution Units With Different Atencies in a Microprocessor System", An IP.com Prior Art Database Technical Disclosure, Original Publication Date: Mar. 25, 2003, IP.com No. IPCOM000011910D, IP.com Electronic Publication Date: Mar. 25, 2003, 3 pages.

"Method and System for Background Execution of Latency Operations", An IP.com Prior Art Database Technical Disclosure, Authors et al.: Disclosed Anonymously, IP.com No. IPCOM000236141D, IP.com Electronic Publication Date: Apr. 8, 2014, 5 pages.

Celio et al., "The Renewed Case for the Reduced Instruction Set Computer: Avoiding ISA Bloat with Macro-Op Fusion for RISC-V", arXiv:1607.02318v1 [cs.AR] Jul. 8, 2016, 16 pages.

Hu et al., "Using Dynamic Binary Translation to Fuse Dependent Instructions", 2017, 12 pages.

Austin, Todd M., "Hardware and Software Mechanisms for Reducing Load Latency", A dissertation submitted in partial fulfillment of the requirements for the degree of Doctor of Philosophy, (Computer Sciences) at the University of Wisconsin—Madison, Jan. 1996, pp. 33-35.

\* cited by examiner

MICROPROCESSOR THAT FUSES LOAD AND COMPARE INSTRUCTIONS

BACKGROUND

The present invention relates generally to the field of execution of load and compare-immediate instructions by microprocessors that are characterized by a load-store architecture.

The Wikipedia entry for "load-store architecture" (as of 7 Jul. 2020) states, in part, as follows: "In computer engineering, a load-store architecture is an instruction set architecture that divides instructions into two categories: memory access (load and store between memory and registers), and ALU operations (which only occur between registers). RISC instruction set architectures such as PowerPC, SPARC, RISC-V, ARM, and MIPS are load-store architectures. For instance, in a load-store approach both operands and destination for an ADD operation must be in registers. This differs from a register-memory architecture (for example, a CISC instruction set architecture such as x86) in which one of the operands for the ADD operation may be in memory, while the other is in a register. The earliest example of a load-store architecture was the CDC 6600. Almost all vector processors (including many GPUs . . . ) use the load-store approach." (footnotes omitted)

The Wikipedia entry for "instruction unit" (as of 7 Jul. 2020) states, in part, as follows: "The instruction unit (IU), also called instruction fetch unit (IFU) or instruction issue unit (ISU), in a central processing unit (CPU) is responsible for organising program instructions to be fetched from memory, and executed, in an appropriate order. It is a part of the control unit, which in turn is part of the CPU. In the simplest style of computer architecture, the instruction cycle is very rigid, and runs exactly as specified by the programmer. In the instruction fetch part of the cycle, the value of the instruction pointer (IP) register is the address of the next instruction to be fetched. This value is placed on the address bus and sent to the memory unit; the memory unit returns the instruction at that address, and it is latched into the instruction register (IR); and the value of the IP is incremented or over-written by a new value (in the case of a jump or branch instruction), ready for the next instruction cycle. This becomes a lot more complicated, though, once performance-enhancing features are added, such as instruction pipelining, out-of-order execution, and even just the introduction of a simple instruction cache." (footnotes omitted)

The Wikipedia entry for "load-store unit" (as of 7 Jul. 2020) states, in part, as follows: "In computer engineering a load-store unit (LSU) is a specialized execution unit responsible for executing all load and store instructions, generating virtual addresses of load and store operations and loading data from memory or storing it back to memory from registers. The load-store unit usually includes a queue which acts as a waiting area for memory instructions, and the unit itself operates independently of other processor units. Load-store units may also be used in vector processing, and in such cases the term 'load-store vector' may be used. Some load-store units are also capable of executing simple fixed-point and/or integer operations." (footnotes omitted)

SUMMARY

According to an aspect of the present invention, there is a method, computer program product and/or system that performs the following operations (not necessarily in the following order): (i) receiving, by an instruction fetch unit of a load-store architecture style processor, a load instruction including an RT field value; (ii) receiving, by the instruction fetch unit, a compare-immediate instruction including an RA field value; (iii) determining, by the instruction fetch unit, that the RT field value is the same as the RA field value; and (iv) responsive to the determination that the RA field value is the same as the RT field value, fusing, by the instruction fetch unit, the load instruction and the compare-immediate instruction to form a single fused instruction.

DETAILED DESCRIPTION

Figure 1:
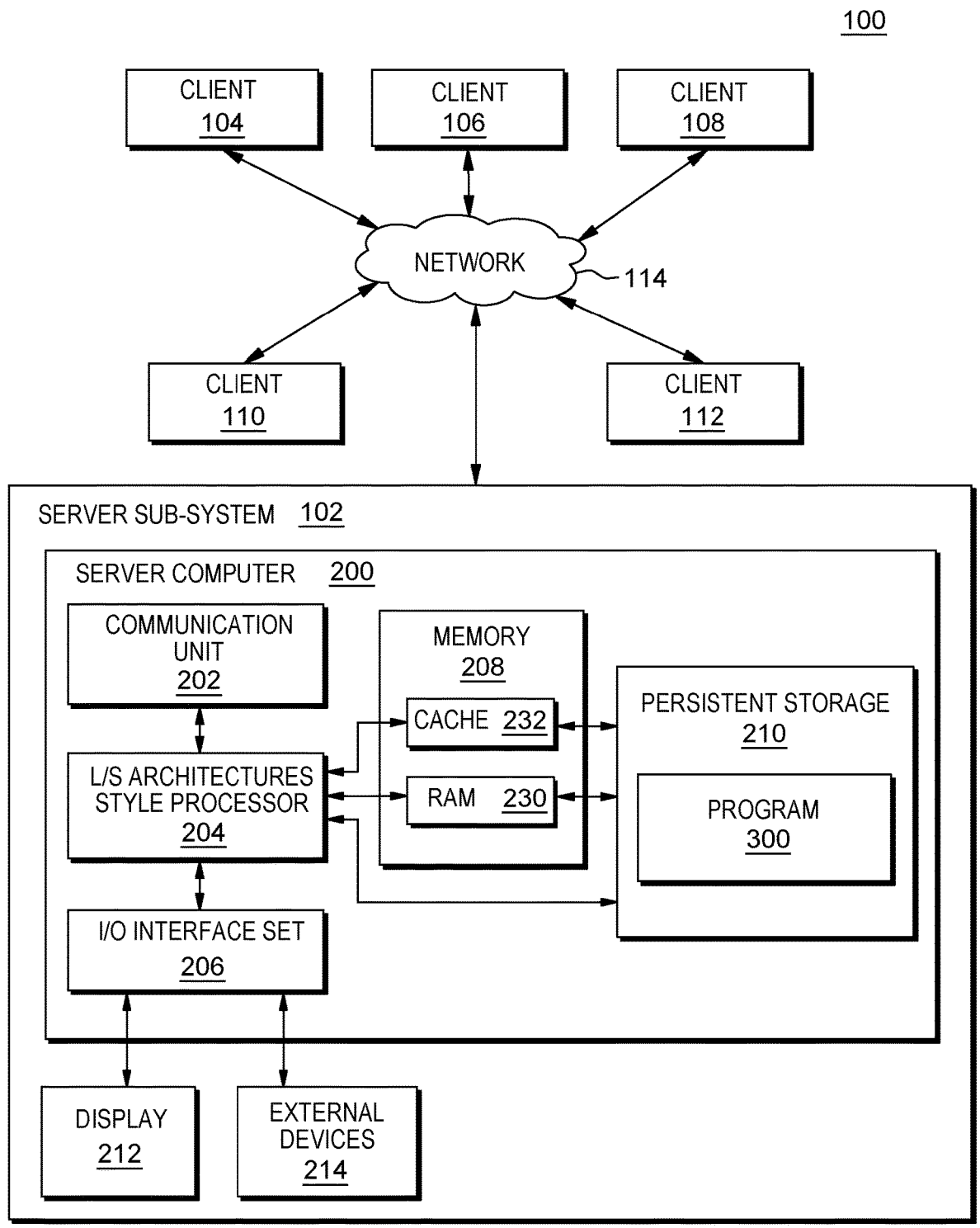
FIG. 1 is a block diagram of a first embodiment of a system according to the present invention.

Some embodiments of the present invention are directed to technology for fusing certain load instructions and compare-immediate instructions in a computer processor having a load-store architecture with respect to transferring data between memory and registers of the computer processor. In some embodiments the load and compare-immediate instructions are consecutive. In some embodiments, the instructions are only merged if: (i) the respective RA and RT fields of the two instructions match; and/or (ii) the immediate field of the compare-immediate instruction has a certain value, or falls within a range of certain values. In some embodiments, the processor only has to issue the fused load compare immediate instruction once to the LSU. This is contrasted against the currently conventional technology, where these instructions are not fused, and, consequently, the load is issued once to the LSU and the compare immediate is issued once to another execution unit. Some embodiments of the present invention have an advantage of execution bandwidth savings as one of the primary benefits of load compare fusion.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; load-store architectures style processor 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of load store architectures style processor 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
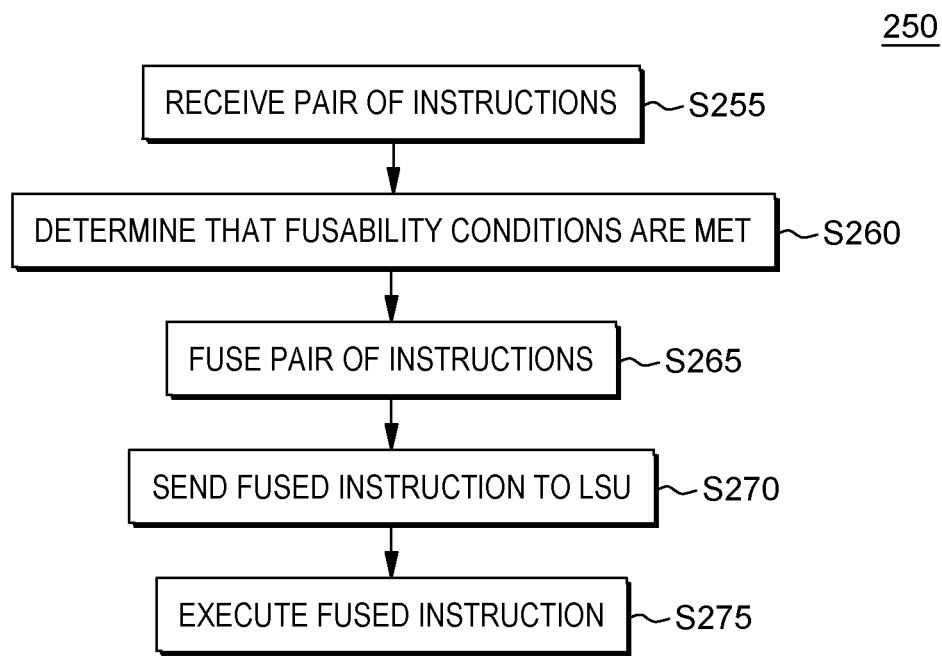
FIG. 2 is a flowchart showing a first embodiment method performed, at least in part, by the first embodiment system.
Figure 3:
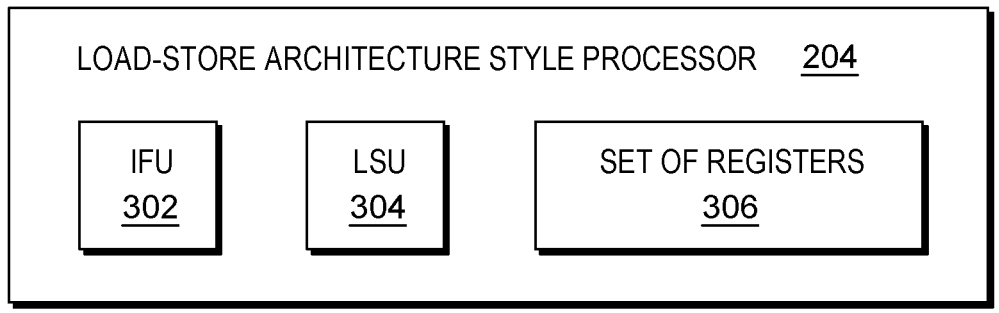
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, load-store architectures style processor 204 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where instruction fetch unit (IFU) 302 of load-store architectures style processor 204 receives the following: (i) a load instruction including an RT field value; and (ii) a compare-immediate instruction including an RA field value.

Processing proceeds to operation S260, where IFU 302 (by machine logic inherent in the hardware design of the processor) determines that all "fusability conditions" are met. In this example, the fusability conditions are as follows: (i) consecutive instructions; and (ii) compare immediate value is limited to certain values, or falls within a range of certain values (this is discussed in more detail in the following subsection of this Detailed Description section). Alternatively, or additionally, there may be other fusability conditions, such as a check that the RA field value is the same as the RT field value. As a possible variation on this embodiment, the load does not really need to be a load immediate instruction. The load can be of any address form, including x-form (RA+RB) or PC relative. In some embodiments of the present invention, there is fusion for both load immediate and load x-form (RA+RB) type of loads.

Processing proceeds to operation S265, where IFU 302 fuses the load instruction and the compare-immediate instruction to form a single fused instruction. The following subsection of this Detailed Description section includes discussion of the form and format that this single fused instruction may take in various embodiments of the present invention.

Processing proceeds to operation S270, where the single fused instruction is communicated to a load-store unit (LSU) 304 of processor 204. The following sub-section of this Detailed Description section discusses some of the operations that may occur in some embodiments between the time the single fused instruction is generated by IFU 302 and the time it is communicated to LSU 304 (for example, operations involving the instruction issue queue and for various mappers).

Figure 4:
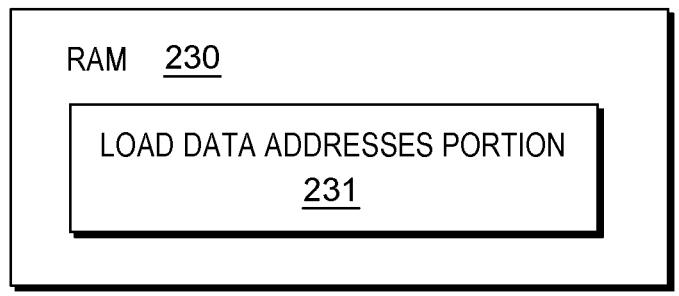
FIG. 4 is a screenshot view generated by the first embodiment system.

Processing proceeds to operation S275, where LSU 304 executes the single fused instruction. This execution includes: (i) loading data from load data addresses portion 231 of RAM 230 (see FIG. 4) to a set of register(s) 306 of processor 204; (ii) performing the compare specified by the compare-immediate instruction to obtain compare results; and (iii) sending the compare results out on a write-back bus (not separately shown in FIG. 3) of processor 204.

III. Further Comments and/or Embodiments

Some embodiments of the present invention relate to fusion execution in a microprocessor. Fusion execution is a generic method to execute two dependent instructions to provide the final result earlier than it would be provided under a normal execution flow. An example of an execution pipe/path that can be used in various embodiments of the present invention will be discussed, below, in connection with FIG. 5A, 5B, 5C. More specifically, some embodiments of the present invention generate an early compare result to provide a condition code (that is, an answer to a compare) earlier to a dependent branch instruction so that the dependent branch instruction can determine whether the branch should have been taken or, alternatively, should not have been taken.

Some embodiments of the present invention may include one, or more, of the following operations, features, characteristics and/or advantages: (i) method to fuse load and compare immediate instructions for a microprocessor; (ii) improve performance by fusing a load instruction with a dependent compare immediate instruction; (iii) the fused Load-Compare instruction will be issued together and write back at different times (one cycle apart); and/or (iv) executing the fused instruction will reduce the latency between these two instructions and increase performance.

An embodiment of a method according to the present invention for reducing the execution latency of a load instruction followed by a dependent compare-immediate instruction includes the following operations: (i) receiving a pair of fetched instructions, with the pair of fetched instructions including a load immediate instruction and a compare immediate instruction; (ii) determining that the pair of fetched instructions satisfies a dependent load-compare fusion criteria; and (iii) responsive to the determination that the pair of fetched instructions satisfies the criteria, issuing the pair of fetched instructions as a single instruction with an encoded immediate field for processing by the load execution unit to fuse load and compare immediate instructions.

An embodiment of a method according to the present invention includes five (5) operations as follows: (i) Instruction Fetch Unit (IFU) operation(s); (ii) dispatch operation; (iii) issue operation; (iv) load-store unit (LSU) operation(s); and (v) completion and exception operations. These five (5) operations will be respectively discussed in the following five (5) paragraphs.

IFU OPERATION(S): Detects that two consecutive Load and Compare-Immediate instructions are fusible. The IFU will detect if the RA field of the Compare-Immediate is the same as the RT field of the Load instruction. Also, it will detect if the immediate field of the Compare Immediate instruction is of 0, 1, or −1 to be eligible for fusion. The IFU will then mark the Store pair as fusible and write the fused instruction into the Icache. After the fused instruction is read from the Icache, IFU will transmit the fused Load-Compare immediate instruction to the ISU on a lane pair.

DISPATCH OPERATION: Dispatch the fused Load-Compare Immediate instruction to the Mapper and ISQ (instruction issue queue) on a lane pair. That is, the fused instruction will take two dispatch slots. Dispatch will read the Mapper for source STF (slice target file)_tags (that is, the pointer into register file) and write the destination STF tags into the GPR/VSR (general purpose register/vector scalar register) Mapper (for the Load) and XFVC (that is, the control registers within the processor) mapper (for the Compare) as normal. Dispatch will compress the Immediate field of the Compare instruction into 2 bits and send them to the ISQ on the even lane of the lane pair as follows: (i) 0b00:unused; (ii) 0b01:1; (iii) 0b11:−1; and (iv) 0b10:0.

ISSUE OPERATION: Issue the fused Load-Compare Immediate instruction once from an even ISQ entry like a regular load. The internal opcode (iop) that is issued for a fused Load-Compare Immediate instruction will have a 2 bit field to represent the 0, 1, −1 immediate value of the compare instruction.

LSU OPERATION(S): The LSU (load-store unit) will execute the Load instruction. When the Load data is available, the LSU will send the Load data on its result bus, as normal, in cycle N. The LSU will then perform the compare in cycle N+1 using its own Load data result and the 2 bit compare immediate field that it receives from the ISQ within the internal opcode (iop) that is sent when a fused load compare immediate instruction is issued to the LSU from the ISQ. The LSU then sends the resulting compare results to the WB bus. The LSU will then finish as normal. For a Load miss, the whole fused instruction is relaunched. When the Load-Compare Immediate is relaunched, the compare will perform as outlined in operations (iii) to (v).

COMPLETION AND EXCEPTION OPERATIONS: Completion will complete both halves of the fused Load-Compare immediate instruction at the same time. If an exception is caused by the fused instruction, then the Completion logic will flush both halves of the fused instruction. It then signals the IFU to refetch the fused instruction as a two separate Load and Compare-Immediate instructions (that is, no fusion). The separate Load and Compare-Immediate instructions will resume execution starting from the Load instruction. The exception will be taken on the appropriate Load half of the original fused instruction.

Figure 5A:
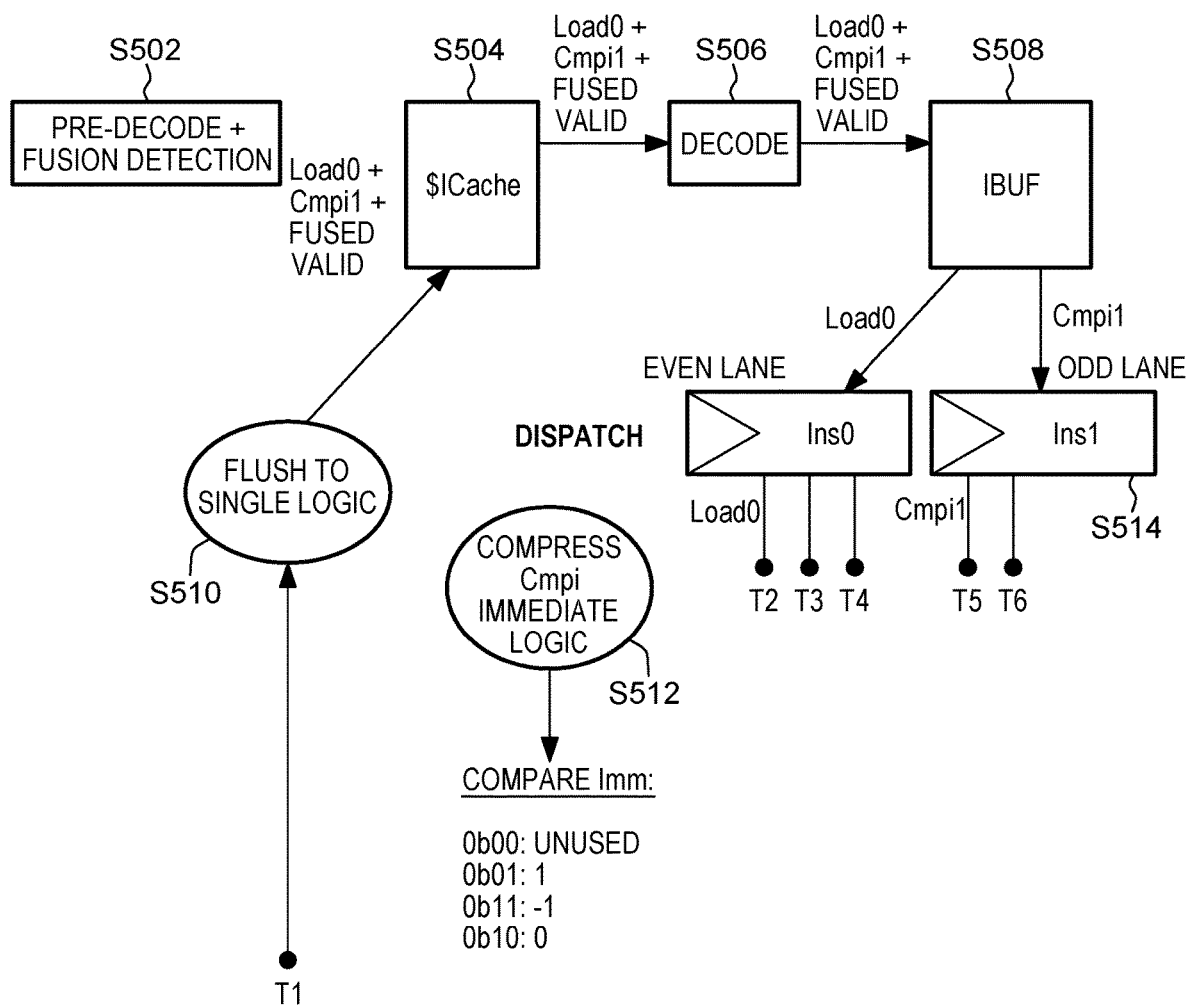
FIGS. 5A, 5B and 5C are 3 portions of a diagram showing a load-compare fusion general concept.
Figure 5B:
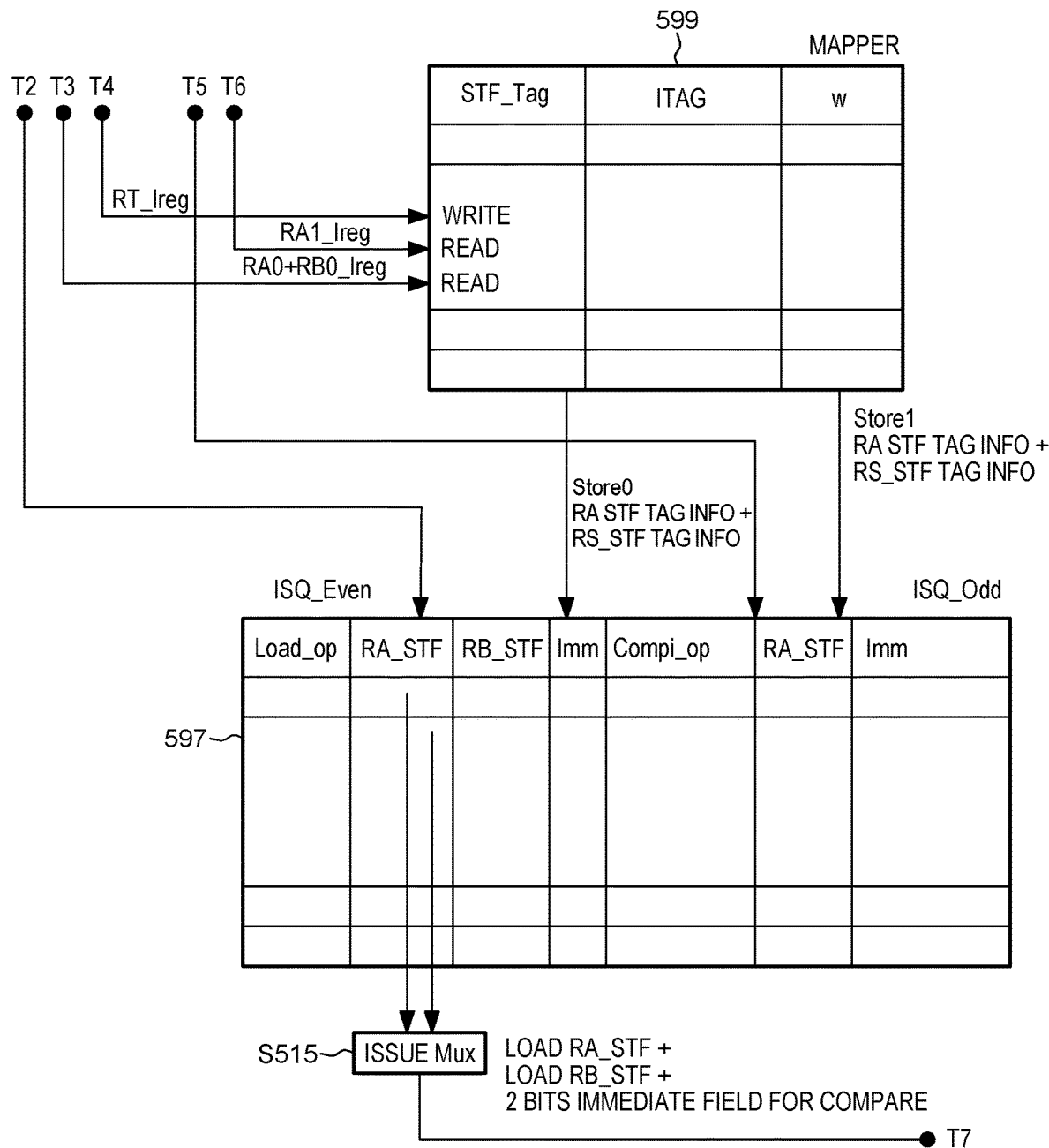
Figure 5C:
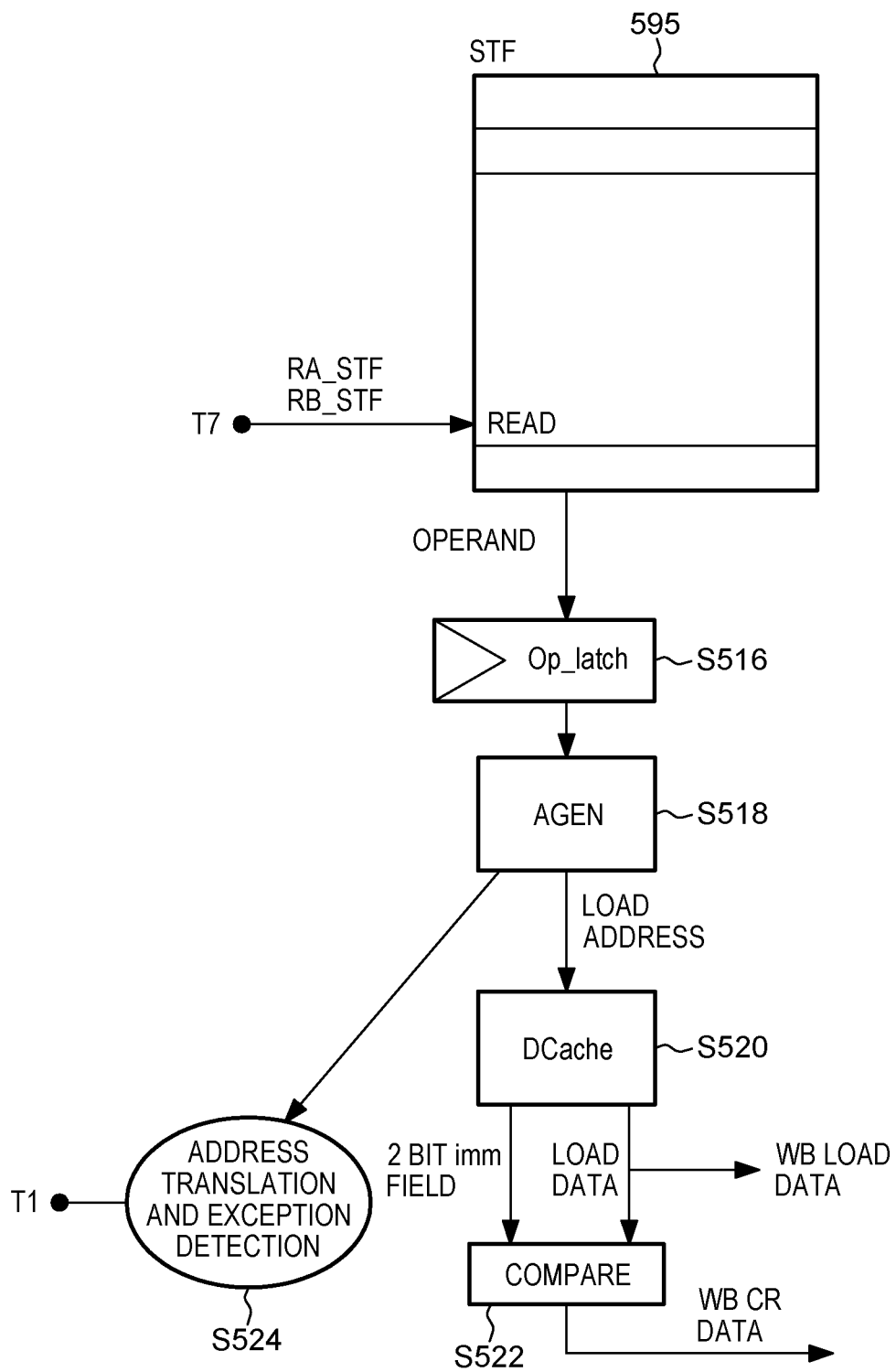

As shown in FIGS. 5A to 5C, diagram 500 (collectively including portions 500a to 500c) represents a load-compare fusion general concept. Terminal points T1 to T7 represent points of connectivity among, and between, portions 500a, 500b and 500c. The various blocks of diagram 500 will be respectively discussed in the following paragraphs.

Mapper table block 599 is used for mapping a logical register to a physical register. For example, an Add instruction that writes to a logical register 5 (not shown in the Figures) can be mapped to physical register 7, and then another more recent Add instruction that writes logical register 5 can be mapped to physical register 8. Mapper tables are typically located in an Instruction Sequencing Unit (ISU). The mapper table holds the mappings between GPR (General Purpose Register) or VSR (Vector-Scalar Register) and physical location within the STF (Slice Target File) Regfile. For each logical register (GPR, VSR), the mapper will hold the physical mapping in the STF as well as any dependency information needed.

Instruction issue queue block 597 receives instruction from the dispatcher and mapping information from mapper table block 599. One primary purpose of instruction issue queue block 597 is to send instructions that include all operands in a form that is ready to be subject to computation. The issue queue is where instructions are scheduled to issue to execution units. This is where the system waits to resolve any dependencies, such as instruction which writes the value of one of the sources.

Slice target register file (STF) block 595 serves as a general register file. General. STF block 595 is located in the execution unit and contains all architected register data and all speculative data that instructions will be needed to perform execution. the Slice Target File (STF) which would be the physical register file which holds the contents of the GPR and VSR registers.

Operation S502 pre-decodes instructions and also detects whether the load and compare instructions can be fused together or not. This operation is performed by an instruction fetch unit (IFU) where the instructions fetched from memory begin decode. This partial decode information along with the rest of the raw instruction are written into the instruction cache.

Operation S504 involves holding of instructions in the level 1 instruction cache. Operation S504 holds instructions that the processor can read out for execution The level 1 instruction cache is a portion of the Instruction Cache ($ICache), which stores the previously read from memory instructions plus the pre-decode information obtained from operation S502.

Operation S506 decodes instructions into a more usable form for the subsequent pipes. This is where final decode of instructions takes place.

Operation S508 uses the IBUF (instruction buffer) to hold instructions that have been read out of the L1 Instruction Cache. The IBUF sends instructions to the Dispatcher. IBUF holds instructions which has been decoded by operation S506 and has not yet been accepted by the dispatch logic (see description of operation S514, below).

Operation S510 processes flush request information, and sends flushing information to break up the fused instruction to refetch and un-fuses the instruction. This represents the flush logic which detects that we must re-fetch in single mode which means fusion of instructions will be stopped for some number of cycles.

Operation S512 looks at the immediate field of the compare and compresses the immediate field into a two (2) bits field to carry along with the instruction for execution. Operation S512 detects if the immediate field has one of the following values: 0, 1, −1. If the immediate field has any other value, then the LD and Cmpi cannot be fused.

At operation S514, the dispatcher dispatches instructions to the mapper and issue queue. A pair of Instructions to be dispatched Ins0 is the even instruction tag (ITAG) and Ins1 is the odd instruction tag (ITAG). ITAG is just a pointer or label of the instruction being dispatched. For load compare fusion, the even itag would hold the load while the odd itag would hold the compare. These two (2) itags then are fused together.

Operation S515 involves the op latch. This is the operand latch for the issued instruction. The sources for the instruction are read out of STF block 595 and are muxed together with other potential source operands to the instruction (bypass regfile if not written yet . . . ). The operand latches feed the instruction execution.

At operation, S516, the multiplexer determines an oldest instruction that is ready to execute, and sends the same to the execution unit. This is the issue mux which is really just a mux of the instructions held in ISQ 597 to pick one instruction to issue out.

At operation S518, AGEN (Address Generation) occurs. This is an execution block that executes the load by generating the address of the load instruction to be sent to the data cache to read out load data. the Load Store Unit (LSU) will generate the memory address to read data from for the load instruction.

At operation S520, is the level 1 data cache holds data, which data can be accessed can access during execution of a load instruction. The data cache (DCache) is where data read from memory is cached and/or buffered. The load address from the operation S518 will index into the DCache array to read data (if it is cached in the core). In the event the read request misses (not cached in DCache), then it would have to go to the next level memory to fetch the data.

Operation S522 is a compare operation that compares: (i) the Load data; against (ii) the value of the compressed immediate field of the compare instruction. Operation S522 performs a limited compare of data read from DCache (see operation S520). This compare can only check against 0, 1, −1. This block then generates the CR result.

Operation S524 includes the following sub-operations: (i) translates the effective address of the load instruction into a real address; (ii) does a look up to see whether the load data is in the data cache or not; and (iii) detects whether the load instruction is causing an exception or not. This is performed by logic inside the LSU which detects if there is a problem with the address that was generated, and the instruction cannot be finished as requested. This will send a flush request which depending on what the problem is may request the op be retried, but without fusion or even to go to an exception handler.

Some embodiments of the present invention may be in a class called fusion execution. Fusion is a generic method to execute two dependent instruction to provide the final result earlier than normal execution flow. Some embodiments of the present invention may generate early compare result to provide condition code earlier to a dependent branch instruction. Some embodiments of the present invention may involve fusion of a load store instruction with a simple Fixed Point instruction. Some embodiments of the present invention include the following operation: fusing a load (any type) with a compare of an immediate value instruction. Some embodiments of the present invention may act on the data read from memory and generate the compare result.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
  receiving, by an instruction fetch unit of a load-store architecture style processor, a load instruction including an RT field value;
  receiving, by the instruction fetch unit, a compare-immediate instruction including an RA field value;
  determining, by the instruction fetch unit, that the RT field value is the same as the RA field value; and
  responsive to the determination that the RA field value is the same as the RT field value, fusing, by the instruction fetch unit, the load instruction and the compare-immediate instruction to form a single fused instruction determining, by the instruction fetch unit, that an immediate field of the compare-immediate instruction has a value of 0, 1, or −1;
  wherein the fusion is further responsive to the determination that an immediate field of the compare-immediate instruction has a value of 0, 1, or −1.

2. The CIM of claim 1 wherein the load instruction and the compare-immediate instruction are consecutive instructions.

3. A non-transitory computer program product (CPP) comprising:
  a set of storage device(s); and
  computer code stored collectively in the set of storage device(s), with the computer code including data and instructions to cause a processor(s) set to perform at least the following operations:
  receiving, by an instruction fetch unit of a load-store architecture style processor, a load instruction including an RT field value,
  receiving, by the instruction fetch unit, a compare-immediate instruction including an RA field value,
  determining, by the instruction fetch unit, that the RT field value is the same as the RA field value, and
  responsive to the determination that the RA field value is the same as the RT field value, fusing, by the instruction fetch unit, the load instruction and the compare-immediate instruction to form a single fused instruction determining, by the instruction fetch unit, that an immediate field of the compare-immediate instruction has a value of 0, 1, or −1,
  wherein the fusion is further responsive to the determination that an immediate field of the compare-immediate instruction has a value of 0, 1, or −1.

4. The CPP of claim 3 wherein the load instruction and the compare-immediate instruction are consecutive instructions.

5. A computer system (CS) comprising:
  a processor(s) set;
  a set of storage device(s); and
  computer code stored collectively in the set of storage device(s), with the computer code including data and instructions to cause the processor(s) set to perform at least the following operations:
  receiving, by an instruction fetch unit of a load-store architecture style processor, a load instruction including an RT field value,
  receiving, by the instruction fetch unit, a compare-immediate instruction including an RA field value,
  determining, by the instruction fetch unit, that the RT field value is the same as the RA field value, and
  responsive to the determination that the RA field value is the same as the RT field value, fusing, by the instruction fetch unit, the load instruction and the compare-immediate instruction to form a single fused instruction determining, by the instruction fetch unit, that an immediate field of the compare-immediate instruction has a value of 0, 1, or −1,
  wherein the fusion is further responsive to the determination that an immediate field of the compare-immediate instruction has a value of 0, 1, or −1.

6. The CS of claim 5 wherein the load instruction and the compare-immediate instruction are consecutive instructions.

* * * * *